United States Patent
Sauer et al.

(10) Patent No.: US 11,248,790 B2
(45) Date of Patent: Feb. 15, 2022

(54) IMPINGEMENT COOLING DUST POCKET

(71) Applicant: Rolls-Royce Corporation, Indianapolis, IN (US)

(72) Inventors: Kevin Sauer, Plainfield, IN (US); Jack D. Petty, Sr., Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 168 days.

(21) Appl. No.: 16/387,807

(22) Filed: Apr. 18, 2019

(65) Prior Publication Data

US 2020/0333006 A1  Oct. 22, 2020

(51) Int. Cl.
*F23R 3/00* (2006.01)
*F01D 5/18* (2006.01)

(52) U.S. Cl.
CPC .............. *F23R 3/002* (2013.01); *F01D 5/187* (2013.01); *F05D 2250/232* (2013.01); *F05D 2260/201* (2013.01); *F23R 2900/03044* (2013.01)

(58) Field of Classification Search
None
See application file for complete search history.

(56) References Cited

U.S. PATENT DOCUMENTS

| | | | |
|---|---|---|---|
| 5,405,242 A | 4/1995 | Auxier et al. | |
| 6,142,734 A | 11/2000 | Lee | |
| 6,155,056 A | 12/2000 | Sampath et al. | |
| 6,237,344 B1 | 5/2001 | Lee | |
| 6,688,110 B2 * | 2/2004 | Dailey | F01D 25/12 60/752 |
| 8,348,613 B2 | 1/2013 | Gregg et al. | |
| 2002/0062945 A1 * | 5/2002 | Hocker | F01D 5/189 165/53 |
| 2003/0140632 A1 * | 7/2003 | Dailey | F23R 3/04 60/752 |
| 2011/0189015 A1 | 8/2011 | Shepherd | |
| 2013/0205794 A1 | 8/2013 | Xu | |
| 2017/0175637 A1 * | 6/2017 | Hughes | F01D 9/023 |
| 2018/0045057 A1 * | 2/2018 | Tallman | F02C 7/12 |
| 2019/0086084 A1 | 3/2019 | Clum et al. | |

\* cited by examiner

*Primary Examiner* — Gerald L Sung
*Assistant Examiner* — Alyson Joan Harrington
(74) *Attorney, Agent, or Firm* — Crowell & Moring LLP

(57) ABSTRACT

A system may be provided that includes a hot section component of a gas turbine engine. The hot section component includes a dual wall, which includes a first wall and a second wall. The first wall includes multiple impingement cooling holes extending through the first wall. The second wall is positioned adjacent the first wall. The first wall and the second wall together define a cooling passage between the first wall and the second wall. Multiple pockets are in a surface of the second wall. Each of the pockets is positioned opposite a respective one of the impingement cooling holes. Each of the pockets is configured to receive a cooling fluid from the respective one of the impingement cooling holes and direct the cooling fluid into the cooling passage. The cooling passage includes a single cooling passage into which the pockets are configured to direct the cooling fluid.

15 Claims, 6 Drawing Sheets

IMPINGEMENT COOLING DUST POCKET

TECHNICAL FIELD

This disclosure relates to gas turbine engines and, in particular, to a hot section dual wall component pocket system for gas turbine engines.

BACKGROUND

Present integrated power and thermal management systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
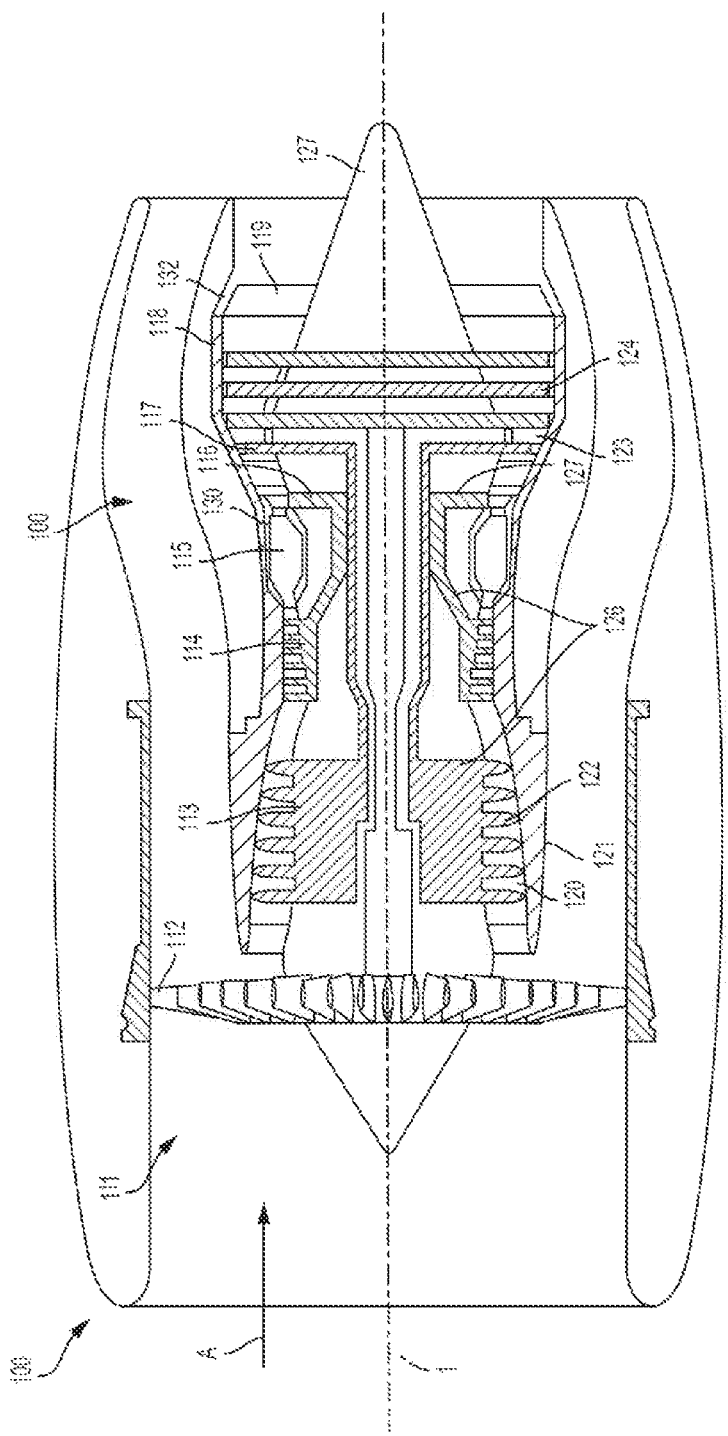
FIG. 1 illustrates a cross-sectional view of an example of a gas turbine engine.

In one example, a system is provided that includes a hot section component of a gas turbine engine. The hot section component includes a dual wall, which includes a first wall and a second wall. The first wall includes multiple impingement cooling holes extending through the first wall. The second wall is positioned adjacent the first wall. The first wall and the second wall together define a cooling passage between the first wall and the second wall. Multiple pockets are in a surface of the second wall. Each of the pockets is positioned opposite a respective one of the impingement cooling holes. Each of the pockets is configured to receive a cooling fluid from the respective one of the impingement cooling holes and direct the cooling fluid into the cooling passage. The cooling passage includes a single cooling passage into which the pockets are configured to direct the cooling fluid.

In another example, a dual wall structure of a gas turbine engine is provided, including a first wall. The first wall includes an impingement cooling hole extending through the first wall. The impingement cooling hole is circumscribable by a first circle having a first diameter. The dual wall structure further includes a second wall adjacent the first wall. The first wall and the second wall together define a cooling passage between the first wall and the second wall. The second wall includes a surface facing the cooling passage. The dual wall structure further includes a pocket in the surface of the second wall. The pocket includes an outer edge, a base, and a sidewall extending between the outer edge and the base. The outer edge is circumscribable by a second circle having a second diameter. A ratio of the first diameter to the second diameter is between 1:1 and 2:5, inclusively. The pocket is positioned opposite the impingement cooling hole.

In yet another example, a hot section component of a gas turbine engine is provided including a first wall and a second wall. The first wall and the second wall define a cooling passage between the first wall and the second wall. The second wall includes a surface that is substantially flat and faces the first wall. The hot section component further includes a plurality of impingement cooling holes in the first wall. The hot section component further includes a plurality of pockets in the second wall. Each pocket of the pockets extends into the second wall and away from the first wall. Each of the pockets includes an outer edge, an oppositely disposed base, and a sidewall extending between the outer edge and the base. Each respective outer edge is positioned opposite a respective impingement cooling hole of the impingement cooling holes. The cooling passage includes a single cooling passage into which the pockets are configured to direct the cooling fluid.

One interesting feature of the systems and methods described below may be to limit or prevent particulate, such as dust or sand, from accumulating in a cooling passage of a hot section component. Such systems and methods include a first wall including an impingement cooling hole and a second wall including a pocket extending into a surface of the second wall. As air and particulate enter the cooling passage via the impingement cooling hole or holes, they may contact a surface of the pocket. The pocket may redirect the air and particulate into the cooling passage in a direction substantially parallel to the surface of the second wall. Alternatively, or in addition, an interesting feature of the systems and methods described below may be that the pocket or pockets are configured to promote accumulation of particulates in the pocket instead of the cooling passage, which limits or prevents blockage of the cooling passage by limiting or preventing buildup of particulate in the cooling passage.

Gas turbine engines may take a variety of forms in various embodiments. For example, the gas turbine engine may be of the axial flow type. In some forms the gas turbine engine may have multiple spools and/or may be a centrifugal or mixed centrifugal/axial flow engine. In some forms, the gas turbine engine may be a turboprop, a turbofan, or a turboshaft engine. Furthermore, the gas turbine engine may be an adaptive cycle and/or variable cycle engine. Other variations are also contemplated.

Gas turbine engines of the axial flow type, and of the types previously enumerated, include a hot section, such as higher pressure regions of the gas turbine. The hot section may include components such as combustors, turbine(s), and exhaust nozzles. Combustors may include components such as combustor liners, and exhaust nozzles may include exhaust nozzles, exhaust liners. The turbine(s) may include components such as one or more axially alternate annular arrays of radially extending stator airfoil vanes and rotary airfoil blades. The demands of modern gas turbine engines may require that the gases that flow through, and thereby drive, the turbine are at extremely high temperature. As the gases flow through the combustors, turbine(s) and exhaust nozzles, the temperature of the gases progressively falls. However, notwithstanding this, the gas temperatures in the hot section may be so high that some form of cooling of the components in the hot section may be required.

Components in the hot section such as liners, turbine seals and turbine airfoils (which includes both blades and vanes) may be cooled internally with a gas or a liquid (a fluid), such as air, that has been tapped from the gas turbine engine's compressor. Methods of cooling may include convection cooling and film cooling. Convection cooling generally refers to a technique of transferring heat from a surface of an object to the environment by the movement of matter, for example, cooling internal surfaces of the component (e.g., liner, seal or airfoil) by directing a steady flow of pressurized cooling fluid through a network of internal passageways of the component. The pressurized cooling fluid may enter the passageways via cooler inlet holes and exiting through hotter exit holes. This may provide for convective heat transfer from the walls of the component to the cooling media.

A hot section component may be any component of a gas turbine engine that may be exposed to hot combustion gases. Accordingly, the design of hot section components such as liners, seals, and airfoils may include channels for the flow of fluid such as the cooling fluid. Such channels may provide convection cooling such that cooling fluid is drawn from a hollow liner, seal, or airfoil interior (for example, reservoir of cooled air) and through small inlet holes into the channels (for example, radially extending passages or impingement holes) where the cooling fluid may absorb heat from the surfaces of the channels. Some of the cooling fluid, such as air, may be exhausted through small exit holes that provide fluid communication between the channels and the liner, seal, or airfoil external surface. As the air is exhausted from the holes, the air may form a film on the liner, seal, or airfoil external surface that provides additional airfoil cooling via film cooling.

Film cooling generally refers to a technique of cooling an external surface of the component (for example, liner, seal or airfoil) that is being heated by the high temperature gas, and may involve directing a flow of relatively cool fluid, such as air, along the component's external surface. The cooling fluid may function as an insulating layer to reduce the unwanted heating of the external surface of the component by the flow of high temperature gas.

FIG. 1 illustrates a gas turbine engine 100 which may include a compressor, a combustor, and a power turbine. The three components may be integrated together to produce a flight propulsion engine. In some examples, the gas turbine engine 100 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various embodiments. Though depicted as an axial flow engine, in some forms the gas turbine engine 100 may have multiple spools and/or may be a centrifugal or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include, in the flow direction identified with arrow "A,", an air inlet 111, a fan 112 rotating inside a casing, an intermediate-pressure compressor 113, a high-pressure compressor 114, a combustion chamber 115, a high-pressure turbine 116, an intermediate-pressure turbine 117 and a low-pressure turbine 118 as well as an exhaust nozzle 119, all of which being arranged about a center engine axis 1. In other example configurations some components may be modified or omitted. For example there may be fewer or greater numbers of pressure turbines (116, 117, 118). Depending on configuration, additional compressors and turbines may be added with intercoolers connecting between the compressors and reheat combustion chambers may be added between the turbines.

The intermediate-pressure compressor 113 and the high-pressure compressor 114 may each include several stages, of which each has an arrangement extending in the circumferential direction of fixed and stationary guide vanes 120, generally referred to as stator vanes and projecting radially inwards from the engine casing 121 in an annular flow duct through the intermediate-pressure compressors 113 and the high-pressure compressor 114. The compressors furthermore may have an arrangement of compressor rotor blades 122 which project radially outwards from a rotatable drum or disk 126 linked to a turbine rotor hub 127 of the high-pressure turbine 116 or the intermediate-pressure turbine 117, respectively.

The turbine sections 116, 117 and 118 may have hot section components such as turbine seals, an arrangement of fixed stator vanes 123 projecting radially inwards from the casing 121 into the annular flow duct through the turbines 116, 117, and 118, and a subsequent arrangement of turbine blades 124 projecting outwards from the turbine rotor hub 127. The compressor drum or disk 126 and the compressor rotor blades 122 arranged thereon, as well as the turbine rotor hub 127 and the turbine blades 124 arranged thereon, may rotate about the center engine axis 1 during operation.

The stationary guide vanes 120, compressor rotor blades 122, fixed stator vanes 23, and turbine blades 124 may collectively be referred to as airfoils and hereinafter this application will refer to blades and/or vanes as airfoils, unless specifically stated otherwise in the text. As discussed herein, at least a portion of the airfoils may be hot section components having a dual-wall cooling configuration to improve the cooling.

The combustion chamber 115 may include hot section components such as a combustion liner 130. The combustion liner 130 may form one or more interior walls, channels, dividers, or passageways surrounding the combustion chamber 115 that are subject to high heat from the hot combustion gasses. The exhaust nozzle 119 may include hot section components such as an exhaust liner 132. The exhaust liner 132 may form one or more walls, channels, dividers, or passageways within the exhaust nozzle 119 that are subject to high heat from the hot combustion gasses exiting the turbine(s). All or portions of the combustion liner 130 and exhaust liner 132 as well as domes, burner seals, aft seals, and combustor tiles may be hot section components that include a dual-wall cooling configuration to improve cooling.

Other products utilizing the present concepts are contemplated herein including but not limited to airframe wing leading edges, and/or other actively cooled components.

In examples, the gas turbine engine hot section components, such as liners, seals and airfoils are formed of a heat resistant superalloy composition. There are various types of superalloy compositions, such as, but not limited to, nickel based or cobalt based compositions. Most superalloy compositions of interest are complicated mixtures of nickel, chromium, aluminum and other select elements. The hot section components, such as liners and airfoils may be of a unitary cast configuration, and/or an assembly of cast components, and/or an assembly of cast and wrought components. For example, the airfoils may have an equiax, directionally solidified or a single crystal alloy structure. In an example, the gas turbine engine airfoils are of a cast single crystal single structure. In other examples, the products are formed of a metallic material, or an intermetallic material or a ceramic material. In still other examples, hot section components may be produced by additive layer manufacturing (ALM), mechanical milling, or electro-chemical machining (ECM) including precision ECM (pECM). Production of hot section components may also involve a secondary operation such as ALM or ECM/pECM applied to a surface produced by other means. The hot section components may also include a thermal barrier coating (TBC), which may provide a heat resistant layer for materials included in the hot section component. The features of the examples illustrated and described with respect to FIG. 1 may be included as, or combined with, features in any other examples described herein.

Figure 2:
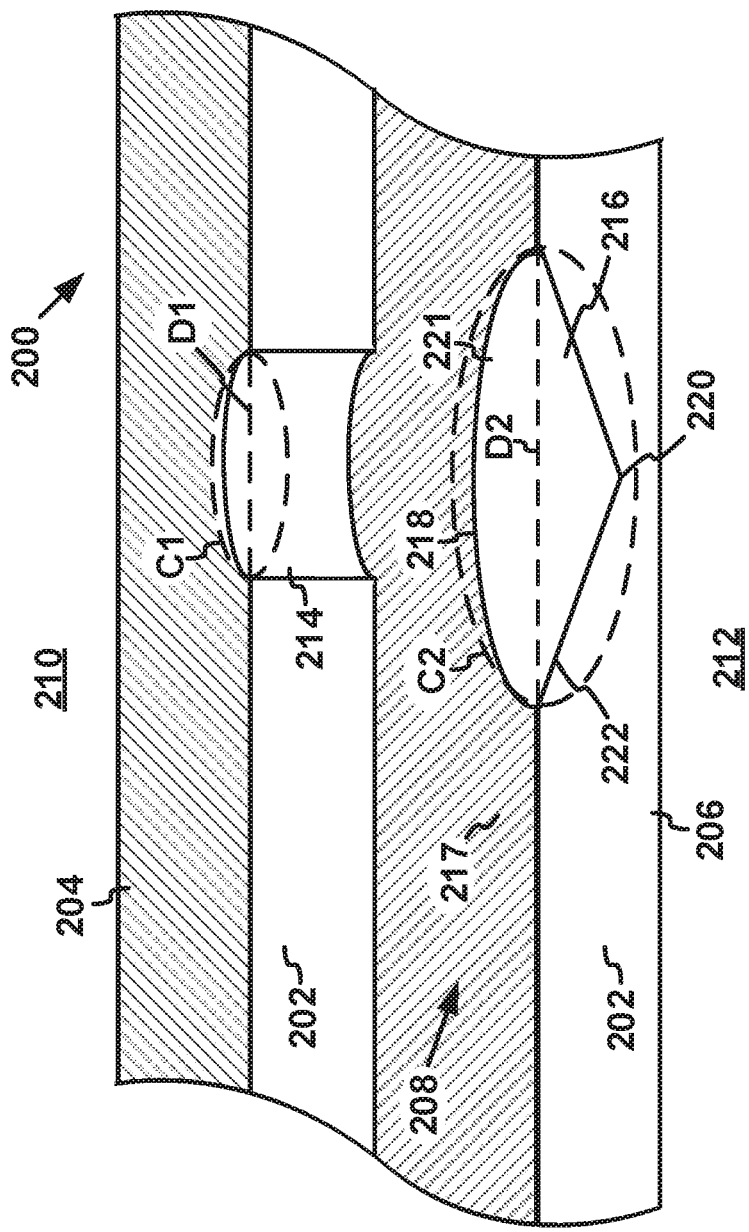
FIG. 2 illustrates a cutaway view of an example of a portion of a hot section component.

FIG. 2 illustrates a perspective view of a cross-section of a portion of a hot section component 200. In this example, the hot section component 200 includes a dual wall 202 of the combustion liner 130 of the gas turbine engine 100. In other examples, the hot section component may be dual wall airfoils, turbine seals, and/or other parts of the gas turbine engine 100 using a dual wall structure for cooling. The example shown in FIG. 2 should not be construed as limiting in any way.

The dual wall 202 may include a first wall 204 and a second wall 206 that are disposed adjacently to form a cooling passage 208. The first wall 204 may be any wall portion that at least partially covers the second wall 206. In this example, an outer surface of the first wall 204 is exposed to a cold side 210 of the hot section component 200, and an inner surface of the second wall 206 may be exposed to a hot side 212 of the hot section component 200. In one example, the first wall 204 may be an outer wall of the combustion liner 130, and the second wall may be an inner wall of the combustion liner 130. In another example, the first wall 204 may be an inner wall or a spar of an airfoil, and the second wall may be an outer wall or a cover sheet of the airfoil. As shown in FIG. 2, the first wall 204 may include an impingement cooling hole 214 formed therein to receive a cooling fluid, such as air. In other examples, as shown, for example in FIG. 6, the first wall 204 may include multiple impingement cooling holes 214. The impingement cooling hole 214 may form a conduit for the flow of the cooling fluid through the first wall 204. In some examples, as shown in FIG. 2, the impingement cooling hole 214 may penetrate the first wall 204 to a surface of the first wall 204 that faces the second wall 206. Alternatively or in addition, the impingement cooling hole 214 may obliquely penetrate the first wall 204 at a predetermined angle with respect to the surface of the first wall 204, such as an angle in a range of twenty-five to ninety degrees.

The impingement cooling holes 214 may be sequentially spaced a predetermined distance apart to form a cooling hole pattern in the first wall 204. In some examples, the impingement cooling holes 214 may have a circle-shaped cross-section. In other examples, a cross-section of the impingement cooling holes 214 may be elliptical-shaped, square-shaped, or any other shape. A predetermined diameter of the impingement cooling holes 214 may be adequate to provide fluid communication between the cooling passage 208 and the cold side 210 of the hot section component 200. Each impingement cooling hole 214 (in other words, the shape defined by the outer edge of each impingement cooling hole 214) may be circumscribable by a first circle C1 having a first diameter D1. As used herein, the phrase "a shape is circumscribable by a circle" means that the circle is the smallest circle capable of enclosing the shape where one or more points of the shape may be on the circle. The diameters of each of the impingement cooling holes 214 may be equal to each other, or the diameters may vary, such as in accordance with location, anticipated temperature of the hot section component 200 in which the impingement cooling hole 214 is present, the topology of the hot section component 200, or any other criteria or condition that warrants different flow rates in different areas of the hot section component 200.

In some examples, the second wall 206 may include a pocket or pockets 216 sequentially spaced a predetermined distance apart to form a pocket pattern. The pockets 216 may be any depression configured to guide fluid, such as air, and environmental particulates (e.g. sand, dust, dirt) into the cooling passage 208. Each of the pockets 216 may extend into a surface 217 of the second wall 206. In some examples, at least a portion of the surface 217 of the second wall 206 may be substantially flat. In other examples, the entirety of the surface 217 may be substantially flat. Each of the pockets 216 may be positioned opposite a respective impingement cooling hole 214. In some examples, as shown in FIG. 2, the pockets 216 may be formed to include a diminishing cross sectional area as the pocket 216 extends into the surface 217 of the second wall 206 and away from the first wall 204. In other examples, the cross sectional area may be uniform along an entire length of the pocket 216.

Each of the pockets 216 includes an outer edge 218, a base 220, and a sidewall 222 extending from the outer edge 218 to the base 220. An outer end of each of the pockets 216 forms a mouth 221 of the respective pocket 216. The mouth 221 is defined by the outer edge 218. An inner end of each of the pockets 216 forms the base 220 of the respective pocket 216. The outer edge 218 may be circular, elliptical, square or any other shape. As shown in FIG. 2, the outer edge 218 may be circumscribable by a second circle C2 having a second diameter D2. In some examples, the second diameter D2 may be a diameter that is greater than or equal to the first diameter D1 and less than or equal to two and half times the first diameter D1. In other words, a ratio of the first diameter D1 to the second diameter D2 may be between 1:1 and 2:5, inclusively, or some other ratio greater than 1. Alternatively, the second diameter D2 may be less than the first diameter D1. In some examples, where the impingement cooling holes 214 are larger than the pockets 216 and/or when a size of the pocket 216 is limited, a diameter of the pocket 216 (in other words, the second diameter D2) may be smaller than a diameter of the impingement cooling holes 214 (in other words, the first diameter D1). In such examples, D2 is less than D1 so a ratio of the first diameter D1 to the second diameter D2 (D1:D2) may be between 1:1 and 3:2, inclusively, or some other ratio less than 1. However, when D2 is less than D1, the effectiveness of the pocket 216 may be less than if D2 were greater than D1.

The base 220 may be any surface, edge, and/or point of the pocket 216 that is positioned furthest from the outer edge 218 and/or the mouth 221 of the pocket 216. The base 220 may be the same shape or a different shape than the outer edge 218. Alternatively, as shown in FIG. 2, the base may be the vertex of a cone. In the illustrated example, the pocket 216 is formed so the base 220 is directly below a center of the second circle C2. In other examples, the pocket 216 may be formed so the base 220 is off-center with respect to the second circle C2. The base 220 of each of the pockets 216 may be positioned to align the pocket 216 with a respective one of the impingement cooling holes 214. For example, the second wall 206 and/or the first wall 204 may be moved laterally until the base 220 is in alignment with a respective one of the impingement cooling holes 214. In some examples, each of the pockets 216 may be aligned with a respective impingement cooling hole 214 such that the cooling hole pattern matches the pocket pattern.

Figure 3:
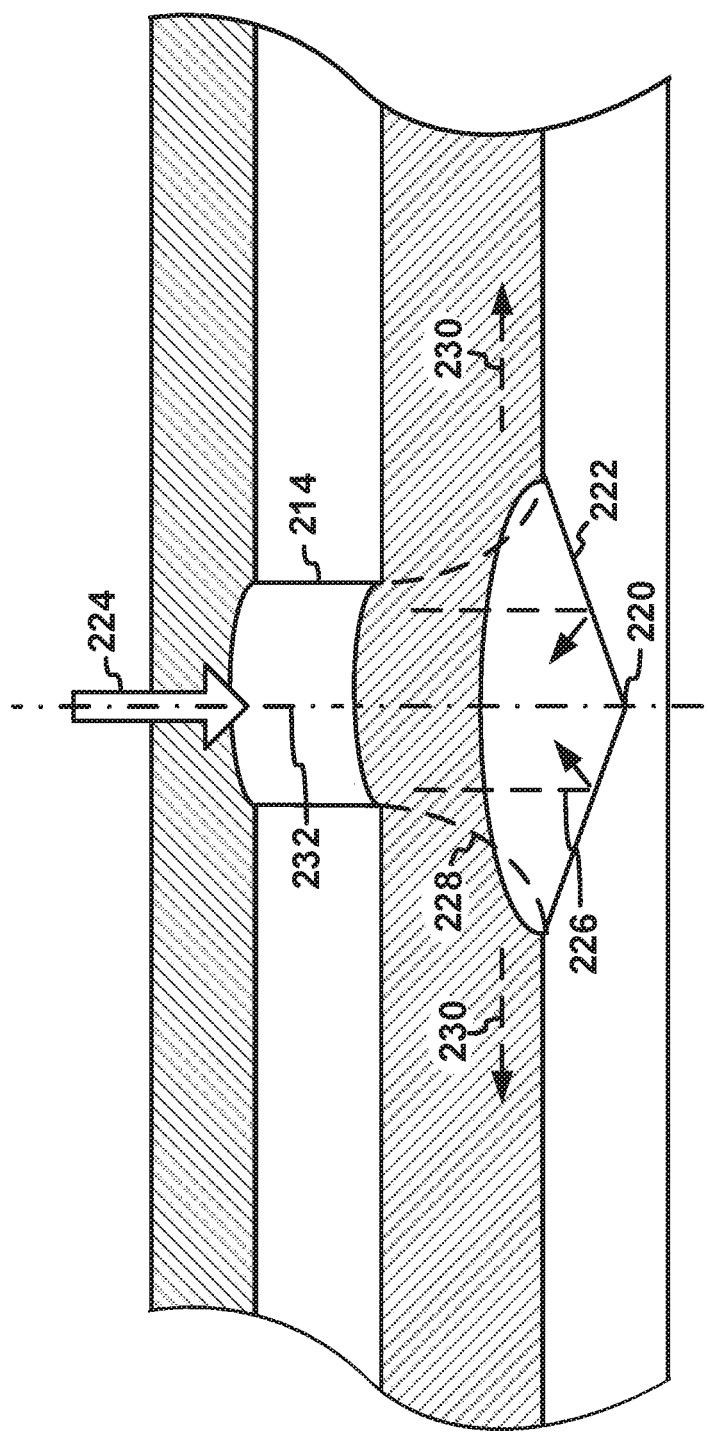
FIG. 3 illustrates another cutaway view of the example of FIG. 2.

As shown in FIG. 3, during operation, impingement jets 224 consisting of working fluid in the form of cooling fluid may exit the respective impingement cooling holes 214 as a flow of cooling fluid that includes a core region 226 and a shoulder region 228 or mixing region. In some examples the outer edge 218 of the pocket 216 may be the same width as the shoulder region 228. In other examples the shoulder region 228 may be narrower or wider than the outer edge 218 of the pocket 216. In some examples, the core region 226 may impact a portion of the pocket 216 near the base 220 and the shoulder region 228 may impact the sidewall 222 of the pocket 216 forming a tapered portion of the pockets 216 between the outer edge 218 and the base 220. In other examples, both the core region 226 and the shoulder region 228 may impact the sidewall 222. The base 220 and the sidewall 222 providing the tapered geometry of the respective pockets 216 re-direct the core region 226 and the shoulder region 228 of the working fluid as illustrated by arrows 230 such that the flow of cooling fluid is a suitable flow within the cooling passage 208. The suitable flow may be any flow of cooling fluid, which enables particles to be maintained within the working fluid. The flow of cooling fluid may exit the impingement cooling holes 214 flowing in a first direction and be directed by the pockets 216 to redistribute in at least a second direction within the cooling passage 208 while minimizing accumulation of deposits of particles in the cooling passage 208. Thus, the suitable flow may operate as a carrier or vehicle for particulate that may be present.

Gas turbine engines are often subject to environmental particulates (e.g. sand, dust, dirt) which are ingested into the engine. These particulates can then enter the core hot gas path and cooling circuits. In addition, domestic particulates (e.g. compressor abradable material) can also enter into cooling circuits.

In the hot section, particulates may interact with hot section components. For example, particulates may be deposited on surfaces in the path of the exhaust gasses within the hot section. Such particulates may result in reduction in gas turbine capacity when deposited on turbine components, such as by reducing High Pressure Turbine (HPT) nozzle area. In addition or alternatively, such particulate deposition may result in blockage of cooling holes on the exhaust gas path side, adhesion to Thermal Barrier Coating (TBC) resulting in damage to and loss of the coating, and/or blockage in the cooling circuit. Blockage in the cooling circuit may include blockage of cooling holes from the cold side and/or internal cooling feature blockage for multi-walled structures. Any of these effects can result in distress to hot section components, leading to early removal of the engine. This reduced on-wing time results in significant disruption to carriers, and (given the current trend for operators to pay for on-wing time) increased cost to the original equipment manufacturer (OEM).

In addition to the previously discussed reasons for particulate accumulation, in the hot gas path, soft or molten particulates may accumulate on the hot surface of hot section components, which is called liquid bridging. There are options for reducing build-up of particles on the hot side and for protecting holes from blockage when particles do accumulate. In the internal flow circuits of dual wall hot section system components, however, the accumulation of very fine particles happens by a different mechanism; very small particles which are not molten or softened can accumulate at the entrance to film or impingement cooling holes, blocking the holes from the inside—within the cooling passage 208. The result is a reduction in film or impingement cooling air, leading to increased component temperatures, which may exacerbate external accumulation and also lead to oxidation and/or thermo-mechanical fatigue failure of the component.

In hot section components with dual wall arrangements, particulate accumulation may occur as deposits formed in the cooling passage 208 between the first and second walls 204 and 206. These deposits can fill up the space in the cooling passage 208, blocking off the impingement cooling holes 214, or can later detach from the surface of the cooling passage 208 and lead to blockage in other areas of the cooling system. Mitigation of such blockage may involve placing a lower bound on the size of the impingement cooling holes 214 and/or the cooling passage 208 to ensure that any build-up will take a long time to fill the passage and result in flow blockage. However, cooling systems are more efficient with a larger number of smaller holes, and this effect is particularly strong for advanced impingement-film cooling systems. The lower bound on cooling hole/passage size results in a less efficient cooling system, leading to greater consumption of cooling air. This in turn leads to a less efficient overall engine cycle and increased losses from mixing of the cooling air with the main gas path. The features of the examples illustrated and described with respect to FIGS. 2 and 3 may be included as, or combined with, features in any other examples described herein.

As illustrated in FIGS. 2 and 3, the pockets 216 may be positioned in the cooling passage 208 to cooperatively operate with the impingement cooling holes 214 to minimize buildup of deposits formed by particulate accumulation without relying on impingement cooling hole size. Instead, cooperative operation is based on the positional relationship of the pockets 216 and the impingement cooling holes 214 and the tapered geometry of the pockets 216 with respect to the impingement cooling holes 214. The positional relationship is accomplished by each of the pockets 216 being formed, or coupled to, the second wall 206 opposite the location where a respective one of the impingement cooling holes 214 is formed in the first wall 204. The tapered geometry of the pockets 216 provides adjustment of a vector field flow direction of the working fluid as the working fluid exits the impingement cooling holes 214, enters the cooling passage 208 and is transitioned to flow along the cooling passage 208 as illustrated by arrows 230 in FIG. 3. Vector fields may represent or model the speed and direction of the moving working fluid through space with regard to strength and direction of the velocity of the working fluid. Thus, the tapered geometry of the pockets 216 may maintain an organized continuous flow of the vector field during the transition to encourage particulate to remain in motion within the flow.

Management of the vector field created by the flow of working fluid may minimize the buildup of deposits in the cooling passage 208. Without the pockets 216 being present, build-up of particle deposits in the cooling passage 208 may occur due to particles getting entrained in a low velocity dead zone at a center of the impingement jets 224 near an impingement surface of the second wall 206 opposite the impingement cooling holes 214 (the impingement surface). The adhesion energy of the particles may be higher than the energy available for rebound such that particles in the flow of working fluid cannot overcome the adhesive forces between the second wall 206 and the particles resulting in formation of deposits on the second wall 206.

In other examples, over time the particles hitting the pockets 216 do not have sufficient rebound energy to overcome the adhesive forces between the surfaces of the pockets 216 and the particles. In this example, the placement and tapered geometry of the pockets 216 allows the pockets 216 to be filled with the particles. This may prevent, lessen, and/or delay a buildup of particles in the cooling passage 208, therefore extending the life of the hot section components.

In some examples, as illustrated in FIGS. 2 and 3, the pockets 216 may be any tapered shape having the outer edge 218 and the base 220 represented by a vertex that creates a vector field flow capable of redirecting the particles. The vertex formed by the base 220 may be centered under the mouth 221. Alternatively, the vertex formed by the base 220 may be oblique with respect to the mouth 221. In the example configuration illustrated in FIGS. 2 and 3, the pockets 216 are illustrated as including a cone shaped structure, with the vertex centered under the mouth 221 to form a right cone. In other examples, where the vertex is not centered under the mouth 221, the pockets 216 may include an oblique cone. In other examples, pockets 216 may be oblique or right polyhedrons, such as pyramids, or oblique or right domes, such as a half sphere. In still other examples, the pockets 216 may be a ramp structure, triangular, or other shapes configured to redirect and/or transition the flow of working fluid into the cooling passage 208 and/or allow the buildup of particles.

As shown in FIGS. 2 and 3, a central axis 232 is common to the pocket 216 and the impingement cooling hole 214 such that the pocket 216 and the impingement cooling hole 214 are axially aligned. The outer edge 218 of the pockets 216 may be formed as part of the second wall 206, and each respective base 220 of the pockets 216 may extend into the second wall 206 and away from the respective impingement cooling hole 214. Each of the pockets 216 may be tapered between the outer edge 218 and the base 220 such that the base 220 forms a vertex with a cross-sectional area that is smaller than the outer edge 218. In the example of a polyhedron, the outer edge 218 may be a polygon shape, such as a square, a rectangular shape, or a triangular shape, whereas in the example of a cone, the outer edge 218 may be circular in shape.

Figure 4:
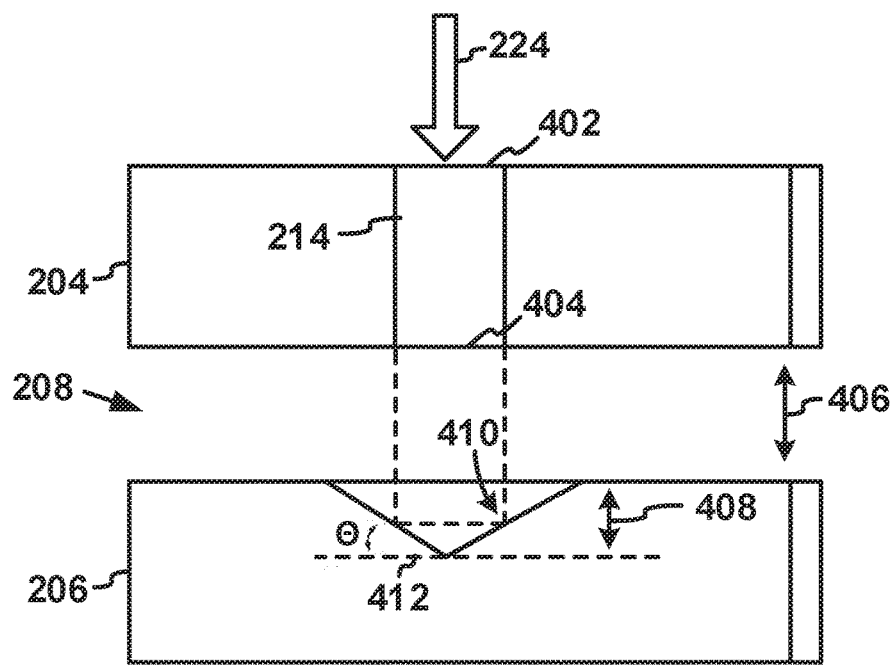
FIG. 4 illustrates a cross-sectional view of the example of FIG. 2.

FIG. 4 is a cross-sectional view of a portion of another example of the impingement cooling hole 214 and an example pocket 216 within the hot section component 200. The pocket 216 may be positioned and aligned in the second wall 206 to cooperatively operate with the impingement cooling hole 214 to direct a flow of working fluid. The flow of working fluid may be directed to change direction from a first direction where the working fluid is flowing along a central axis of the impingement cooling hole 214 to a second direction along the first wall 204 and the second wall 206. The impingement cooling hole may include an inlet 402 and outlet 404. The inlet 402 may be configured to receive the working fluid, and the outlet 404 may be configured to supply the working fluid to the cooling passage 208. An impingement gap (Z) 406 between the first wall 204 and the second wall 206, which defines the cooling passage 208, may have a predetermined distance. As an example, the predetermined distance in terms of impingement gap (Z) 406 divided by impingement hole exit (D) 404 defined as Z/D may be as small as 0.33, or as large as 2.5. As shown in FIG. 3, the shoulder region 228 widens as the impingement gap 406 increases. The distance that the shoulder region 228 widens may be directly proportional to the impingement gap 406. In other words, as the impingement gap 406 increases, the width of the shoulder region 228 increases as well. The pocket 216 may extend into the second wall 206 a predetermined depth 408. The taper of the pocket 216 may be a predetermined radius of curvature or a predetermined angle ($\theta$). A taper angle ($\theta$), as shown in FIG. 4, may be formed between the sidewall and a base plane 412. The base plane 412 may be any plane that intersects the base 220 and is parallel to the surface 217 of the second wall 206. The taper angle ($\theta$) may vary from a shallow angle, for example ten degrees, up to a steep angle, for example 60 degrees. As shown in FIG. 4, the taper may be uniform and the sidewall may be substantially straight. In other examples, the taper may be non-uniform, so that the sidewall is curved near the mouth 221 and/or the base 220 of the pocket 216. In some examples, the mouth 221 and the base 220 may have the same diameter, for example, when the pocket 216 is cube shaped. In this example the taper angle 412 may be ninety degrees. In other examples, where a diameter of the base is greater than a diameter of the mouth 221, the taper angle 412 may be greater than ninety degrees. The features of the examples illustrated and described with respect to FIG. 4 may be included as, or combined with, features in any other examples described herein.

Figure 5:
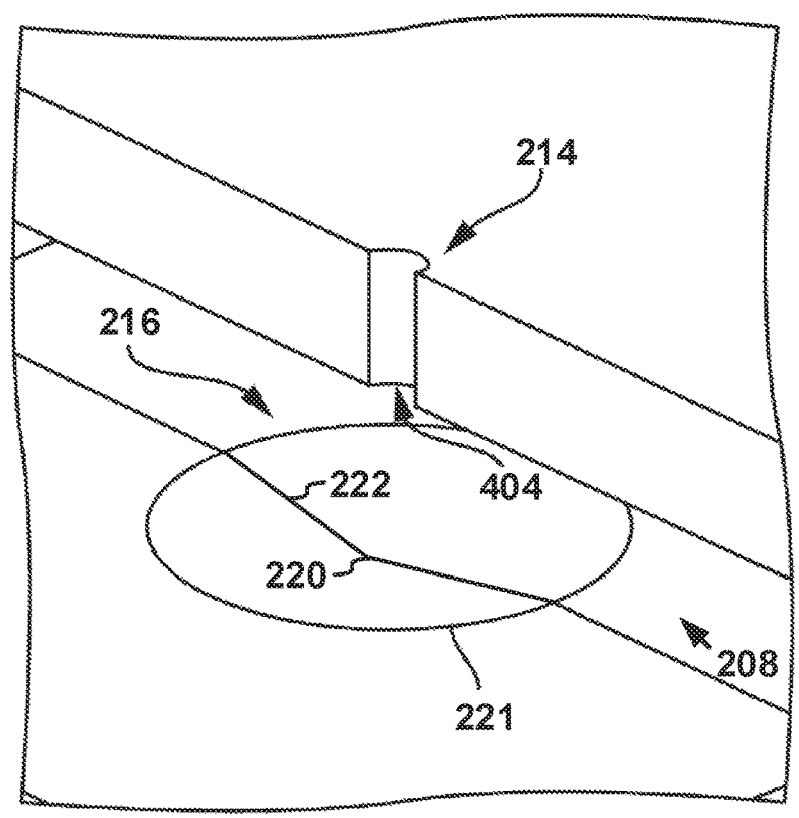
FIG. 5 illustrates another cutaway perspective view of the example of FIG. 2.

FIG. 5 is a cutaway perspective view of another example of the impingement cooling hole 214 aligned to cooperatively operate with an example pocket 216 within the hot section component 200. As illustrated in FIGS. 4 and 5, a cross sectional area of the base 220 at a distal end of the pocket 216 may be less than a cross-sectional area of the outlet 404 of the impingement cooling hole 214. In addition, a cross-sectional area of the mouth 221 at a proximate end of the pocket 216 is larger than the cross-sectional area of the outlet 404. Due to the pocket 216 being tapered, at a vertical depth 408 of the pocket 216 between the mouth 221 and the base 220, the cross-sectional area of the outlet 404 and the cross-sectional area of the pocket 216 may be equal at a point 410. As shown in FIG. 4, in this example, the point may be positioned between the mouth 221 and the base 220. Alternatively or in addition, the point may be positioned at the mouth 221 and/or the base 220.

The sidewalls 222 of the pockets 216 extending between the mouth 221 and the base 220 may be planar surfaces forming the tapered body of the pockets 216 as illustrated in FIG. 4. Alternatively or in addition, the sidewalls 222 may be formed with a predetermined radius of curvature. In some examples, the predetermined radius of curvature may be a non-zero radius of curvature. As shown in FIG. 5 the pocket 216 may be formed as a right cone. In other examples the pocket 216 maybe dome shaped, the predetermined radius of curvature may be convex, concave, or a combination of both convex and concave. The predetermined radius of curvature may be chosen to minimize flow stagnation areas in the cooling passage 208 such that particulate included in the flow of working fluid remains suspended in the flow of working fluid as the flow of working fluid transitions to flowing in the cooling passage 208. Working fluid exiting the outlet 404 of the impingement cooling hole 214 flows tangentially along the sidewall 222 so as to be redirected from flowing in a first direction upon leaving the outlet 404 to flowing in a second direction in the cooling passage 208. The features of the examples illustrated and described with respect to FIG. 5 may be included as, or combined with, features in any other examples described herein.

Figure 6:
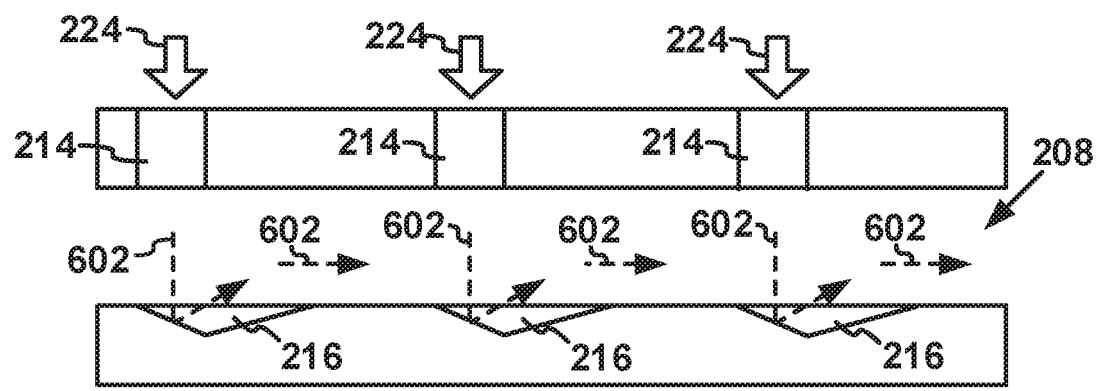
FIG. 6 illustrates a cross-sectional view of another example of the hot section component.

FIG. 6. illustrates a cross-sectional view of another example of the hot section component which includes multiple impingement cooling holes 214 and pockets 216. As shown in FIG. 6, the pockets 216 may be positioned offset with respect to the impingement cooling holes 214. In this example, the pockets 216 are configured to direct the working fluid and/or the particulate in a predetermined direction. As shown in FIG. 6, the working fluid travels through the impingement cooling holes 214 into the cooling passage 208 and is transitioned to flow along the cooling passage 208 as illustrated by arrows 602. The features of the examples illustrated and described with respect to FIG. 6 may be included as, or combined with, features in any other examples described herein.

Figure 7:
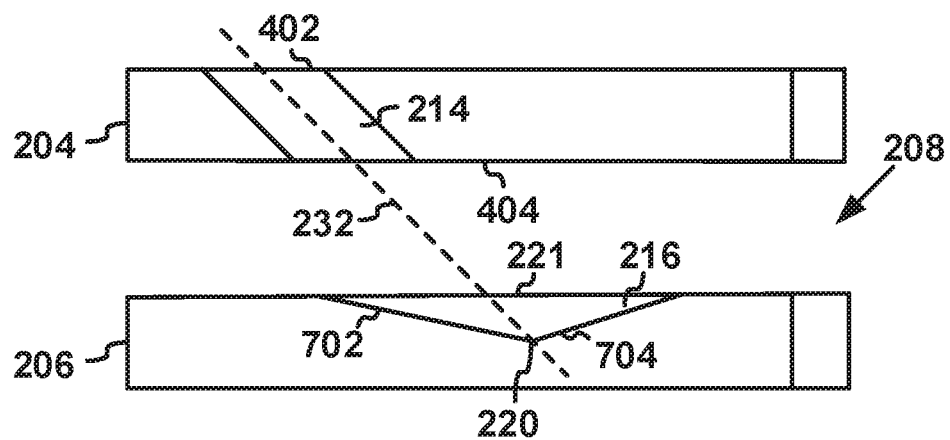
FIG. 7 illustrates a cross-sectional view of another example of the hot section component.

FIG. 7 illustrates another example of the hot section component 200 in which the impingement cooling holes 214 are obliquely formed in the first wall 204. In this example, the impingement cooling holes 214 may form a conduit for the flow of the working fluid that obliquely penetrates the first wall 204 to provide fluid communication with the cooling passage 208. As shown in FIG. 6, the impingement cooling holes 214 penetrate the first wall 204 at a predetermined angle. The predetermined angle is formed between a central axis of the impingement cooling hole 214 and a surface of the first wall 204. The predetermined angle may be in a range between ten and ninety degrees. In this examples, the inlet 402 and the outlet 404 of the impingement cooling holes 214 may be elliptical.

As shown in FIG. 7, the base 220 of the pocket 216 is not centered with respect to the mouth 221. In this example, the pocket 216 is an oblique polyhedron. In other examples, the pocket 216 may be other oblique shapes. The pocket 216 cooperatively operates with the impingement cooling hole 214 to maintain a suitable flow of working fluid. The working fluid exits the impingement cooling hole 214 and flows tangentially along the sidewall 222 in order to transition from flowing in a first direction through the impingement cooling hole 214 to flowing in a second direction within the cooling passage 208. Since the pocket 216 is positioned opposite the impingement cooling hole 214, particulate entering the cooling passage 208 may remain suspended in the flow of working fluid being transitioned from the impingement cooling hole 214 to the cooling passage 208. Alternatively or in addition, the particulate may accumulate in the pocket 216 over time.

The sidewall 222 of the pocket 216 may be a planar surface or a surface formed with a radius of curvature. In examples where the sidewalls are planar surfaces without a predetermined radius of curvature as shown in FIG. 7, a length of the first side wall 702 may be greater than a length of the second sidewall 704. Alternatively or in addition, the taper of the first sidewall 702 between the mouth 221 and the base 220 may be different than the taper of the second sidewall 704. In other examples where the pocket is oblique, the sidewall 222 may include multiple sidewalls each with a different predetermined radius of curvature to accommodate the flow of working fluid on opposite sides of the pocket 216. For example, a first predetermined radius of curvature on the first sidewall of the pocket may be different from a second predetermined radius of curvature on the second sidewall.

The base of the pocket 216 may project into the second wall 206 and away from the mouth 221 to align with the central axis 232 of the impingement cooling hole 214. Accordingly, the flow of working fluid may be transitioned to have suitable flow in different directions, such as opposite directions, within the cooling passage 208. Thus, the flow of working fluid in one direction may be directed by the first sidewall 702, and the flow of working fluid in another direction may be directed by the second sidewall 704. The features of the examples illustrated and described with respect to FIG. 7 may be included as, or combined with, features in any other examples described herein.

Figure 8:
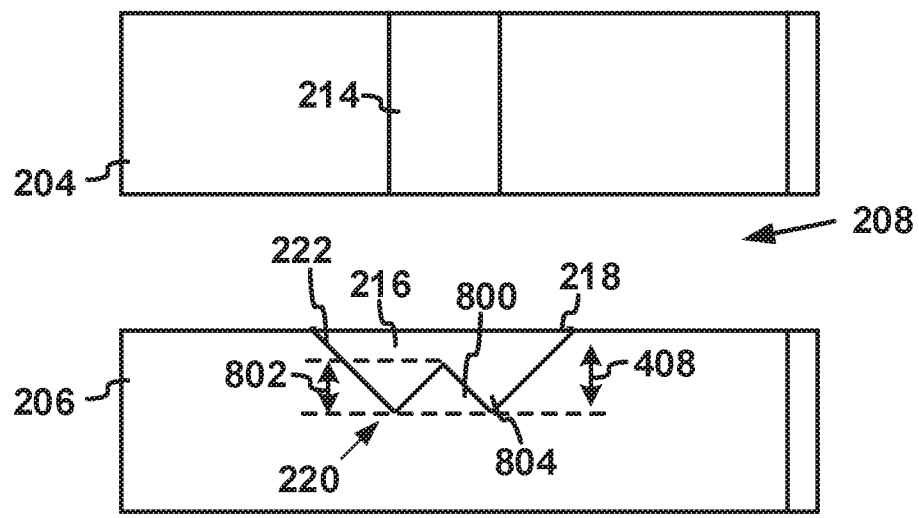
FIG. 8 illustrates a cross-sectional view of another example of the hot section component.

FIG. 8 illustrates another example of the hot section component in which the base 220 of the pocket 216 includes a post portion 800 extending toward the impingement cooling hole 214. The post portion 800 may be any projection extending from the base 220 of the pocket 216 toward the impingement cooling hole 214 or the another point of the first wall 204. In one example, the post portion 800 may be cone shaped having a base, a vertex, and a tapered side extending between the base and the vertex. In other examples, the post portion 800 may be a polyhedron, a half sphere, or a ramp. As show in FIG. 8, a diameter of the post portion 800 may be less than the second diameter D2 of the outer edge 218 of the pocket 216. Additionally, in this example, a height 802 of the post portion 800 may be less than the predetermined depth 408 of pocket. In other examples, the height 802 of the post portion may be greater than or equal to the predetermined depth 408 of the pocket 216. As show in FIG. 8, the sidewall of the post portion 800 together with the sidewall 222 of the pocket 216 define a trough 804 extending around the post portion 800.

During operation, working fluid entering the impingement cooling hole 214 contacts the post position 800, and the post portion 800 redirects the working fluid into cooling passage 208. Particulate entering from the impingement cooling hole 214, may be redirected by the post portion 800 into the cooling passage 208. In this example, the post portion 800 may help to lessen and/or prevent particulate from accumulating in the base 220 of the pocket 216. Alternatively, the post portion 800 may be positioned to allow the particulate to build up in the trough 804. The features of the examples illustrated and described with respect to FIG. 8 may be included as, or combined with, features in any other examples described herein.

Figure 9:
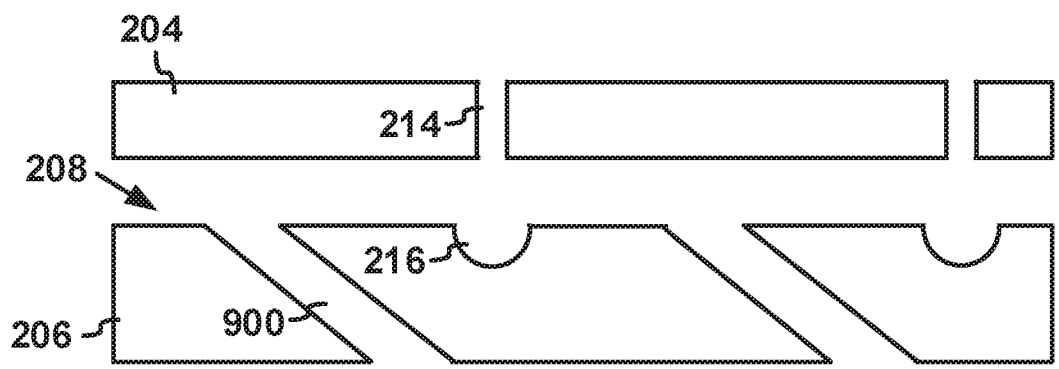
FIG. 9 illustrates a cross-sectional view of another example of the hot section component.

FIG. 9 illustrates another example of the hot section component 200 which has multiple cooling channels 900 extending through the second wall 206. In some examples, the cooling channels may extend along an entire length of the second wall 206. In other examples the cooling channels 900 may be a series of individual tubular passageways arranged in the second wall 206. As shown in FIG. 9, the pockets 216 may be bowl and/or half-sphere shaped. In this example, the sidewall 222 may have a predetermined radius of curvature, and the base 220 may be a point that is positioned furthest from the outer edge 218 of the pocket 216.

During operation, a portion of the working fluid entering the cooling passage 208 from the impingement cooling holes 214 and/or the pockets 216 may be directed into the cooling channels 900 and through the second wall 206. The features of the examples illustrated and described with respect to FIG. 9 may be included as, or combined with, features in any other examples described herein.

Each component may include additional, different, or fewer components. For example, the pockets 216 may be implemented having a number of different angles. In some examples, all of pockets 216 implemented in a dual wall structure may have the same size and shape. In other examples, the pockets in a dual walls structure may have different shapes and/or sizes. In some examples, every impingement cooling hole 214 in a dual wall structure may have a respective one of the pockets 216. In other examples there may be more impingement cooling holes 214 than pockets 216 in a dual wall structure. Alternatively, a dual walls structure may include more pockets 216 than impingement cooling holes.

The system may be implemented with additional, different, or fewer components. In some examples, the system may include only the hot section component 200 having a dual-wall structure with impingement cooling holes 214 and pockets 216. In other examples, the system may include only the impingement cooling hole 214 and the pocket 216 as a single cooling feature positionable within a component of a gas turbine engine. In some examples, each pocket 216 is symmetrically aligned with the respective impingement cooling hole 214. In this example, working fluid is directed in multiple directions. In other examples, the impingement cooling holes 214 and the pockets 216 may be offset or asymmetrically aligned. In these examples, the working fluid is directed predominately in one direction. Alternatively, or in addition, the pockets 216 themselves may be asymmetrically shaped to encourage a flow of the working fluid in a predetermined direction.

With reference to FIGS. 1-9, a dual wall hot section component such as a combustion liner, turbine seal segment, turbine vane, turbine blade may include pockets, such as a cone, polyhedron or a ramp positioned on the interior surface of the inner wall of the cooling passage directly opposite impingement cooling holes to reduce or eliminate the stagnation zone, and/or to change the angle of incidence of ballistic particles. There are a number of methods of producing dual wall hot section components with pockets providing an impingement surface feature to reduce or eliminate deposits formed by particulate build up. The method may be, for example, a primary operation for forming the pockets in the passageways. Examples of primary operations that could produce these features include casting, additive layer manufacturing (ALM), mechanical milling, drilling, or electro-chemical machining (ECM) including precision ECM (pECM). The method may also be, for example, a secondary operation such as ALM or ECM/pECM applied to a surface produced by other means. First and second walls forming the cooling passage are typically produced in the initial casting of a dual wall hot section component, or are created using traditional machining processes (e.g. EDM, laser or waterjet). These methods typically result in a relatively smooth surface relative to the size of the features contemplated.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

A first aspect relates to a system comprising: a hot section component of a gas turbine engine comprising a dual wall, the dual wall including a first wall and a second wall, the first wall comprising a plurality of impingement cooling holes extending through the first wall, the second wall positioned adjacent the first wall, the first wall and the second wall together defining a cooling passage between the first wall and the second wall, wherein a plurality of pockets are in a surface of the second wall, wherein each of the pockets is positioned opposite a respective one of the impingement cooling holes, and wherein each of the pockets is configured to receive a cooling fluid from the respective one of the impingement cooling holes and direct the cooling fluid into the cooling passage, wherein the cooling passage includes a single cooling passage into which the pockets are configured to direct the cooling fluid.

A second aspect relates to the system of aspect 1, wherein each of the pockets further comprises an outer edge, a base, and a sidewall extending between the base and the outer edge.

A third aspect relates to the system of any preceding aspect, wherein the sidewall is tapered between the outer edge and the base.

A fourth aspect relates to the system of any preceding aspect, wherein each sidewall forms a taper angle between the sidewall and a base plane, wherein the base plane intersects the base and is parallel to a surface of the second wall, wherein the taper angle is between ten and forty degrees, inclusively.

A fifth aspect relates to the system of any preceding aspect, wherein the sidewall includes a curved surface having a non-zero radius of curvature.

A sixth aspect relates to the system of any preceding aspect, wherein an opening of each impingement cooling hole that faces the second wall is circumscribable by a first circle having a first diameter and each respective outer edge of the pockets is circumscribable by a second circle having a second diameter, wherein the second diameter is greater than or equal to the first diameter.

A seventh aspect relates to the system of any preceding aspect, wherein each of the pockets is cone shaped.

An eighth aspect relates to a dual wall structure of a gas turbine engine, the dual wall structure comprising: a first wall comprising an impingement cooling hole extending through the first wall; a second wall adjacent the first wall, the first wall and the second wall together defining a cooling passage between the first wall and the second wall, wherein the second wall includes a surface facing the cooling passage; and a pocket in the surface of the second wall, the pocket having an outer edge, a base, and a sidewall extending between the outer edge and the base, wherein an opening of the impingement cooling hole facing the surface of the second wall is circumscribable by a first circle having a first diameter and the outer edge is circumscribable by a second circle having a second diameter, wherein a ratio of the first diameter to the second diameter is between 1:1 and 2:5, inclusively, wherein the pocket is positioned opposite the impingement cooling hole.

A ninth aspect relates to the dual wall structure of aspect 8, wherein the impingement cooling hole has a central axis, and wherein the central axis intersects a center of the first circle and a center of the second circle.

A tenth aspect relates to the dual wall structure of any preceding aspect, wherein the pocket is configured to redirect cooling fluid received from the impingement cooling hole into the cooling passage in a direction that is radially away from a center of the second circle.

An eleventh aspect relates to the dual wall structure of any preceding aspect, wherein the central axis intersects a vertex of the base.

A twelfth aspect relates to the dual wall structure of any preceding aspect, wherein a cross sectional area of the pocket is equal to a cross sectional area of the impingement cooling hole at a point on the sidewall.

A thirteenth aspect relates to the dual wall structure of any preceding aspect, wherein an area of the base is less than an area defined by the outer edge.

A fourteenth aspect relates to the dual wall structure of any preceding aspect, wherein the base further comprises a post portion extending from the base and toward the impingement cooling hole.

A fifteenth aspect relates to a hot section component of a gas turbine engine, the hot section component comprising: a first wall and a second wall, the first wall and the second wall defining a cooling passage between the first wall and the second wall, wherein the second wall includes a surface that is substantially flat and faces the first wall, wherein the first wall includes a plurality of impingement cooling holes, and wherein the second wall includes a plurality of pockets, each of the pockets extending into the second wall and away from the first wall, wherein each of the pockets includes an outer edge, an oppositely disposed base, and a sidewall extending between the outer edge and the base, wherein each respective outer edge is positioned opposite a respective impingement cooling hole of the impingement cooling holes, and wherein the cooling passage includes a single cooling passage into which the pockets are configured to direct the cooling fluid.

A sixteenth aspect relates to the hot section component of any preceding aspect, wherein the base is axially positioned in alignment with a respective one of the impingement cooling holes.

A seventeenth aspect relates to the hot section component of any preceding aspect, wherein a shape of the pockets is a cone, a polyhedron, a half sphere, or a ramp positioned in the second wall.

An eighteenth aspect relates to the hot section component of any preceding aspect, wherein the impingement cooling holes are positioned in a first predetermined pattern, and the pockets are positioned in a second predetermined pattern that matches the first predetermined pattern.

A nineteenth aspect relates to the hot section component of any preceding aspect, wherein each of the pockets are positioned offset with respect to the respective impingement cooling holes.

A twentieth aspect relates to the hot section component of any preceding aspect, wherein the impingement cooling holes are positioned obliquely in the first wall, wherein a central axis of a respective impingement cooling hole intersects a vertex of the base of the respective pocket.

In addition to the features mentioned in each of the independent aspects enumerated above, some examples may show, alone or in combination, the optional features mentioned in the dependent aspects and/or as disclosed in the description above and shown in the figures.

What is claimed is:

1. A system comprising:
    a hot section component of a gas turbine engine comprising:
        a dual wall comprising a first wall and a second wall, the first wall comprising an impingement cooling hole extending through the first wall, the second wall positioned adjacent the first wall, the first wall and the second wall together defining a cooling passage between the first wall and the second wall,
        a pocket recessed in a surface of the second wall, the pocket positioned opposite the impingement cooling hole, the pocket configured to receive a cooling fluid from the impingement cooling hole and direct the cooling fluid into the cooling passage, wherein the cooling passage includes a single cooling passage into which the pocket is configured to direct the cooling fluid, wherein the pocket is cone-shaped and comprises an outer edge at the surface of the second wall, a vertex, and a sidewall extending between the vertex and the outer edge, wherein the sidewall is tapered between the outer edge and the vertex, and wherein the sidewall forms a taper angle between a point of the sidewall and a base plane that is between ten and forty degrees inclusively, wherein the point of the sidewall is closer to the outer edge than the vertex, and wherein the base plane intersects the vertex and is parallel to the surface of the second wall.

2. The system of claim 1, wherein the sidewall includes a curved surface having a non-zero radius of curvature.

3. The system of claim 1, wherein an opening of the impingement cooling hole faces the second wall, the opening circumscribable by a first circle having a first diameter and the outer edge circumscribable by a second circle having a second diameter, wherein the second diameter is greater than or equal to the first diameter.

4. The system of claim 1, wherein the first wall is an outer wall of a combustion liner and the second wall is an inner wall of the combustion liner.

5. The system of claim 1, wherein the first wall is an inner wall of an airfoil and the second wall is an outer wall of the airfoil.

6. A dual wall structure of a gas turbine engine, the dual wall structure comprising:
    a first wall comprising an impingement cooling hole extending through the first wall;
    a second wall adjacent the first wall, the first wall and the second wall together defining a cooling passage between the first wall and the second wall, wherein the second wall includes a surface facing the cooling passage; and
    a pocket recessed in the surface of the second wall, wherein the pocket is cone-shaped and comprises an outer edge at the surface of the second wall, a vertex, and a sidewall extending between the outer edge and the vertex, wherein an opening of the impingement cooling hole facing the surface of the second wall is circumscribable by a first circle having a first diameter and the outer edge is circumscribable by a second circle having a second diameter, wherein a ratio of the first diameter to the second diameter is between 1:1 and 2:5, inclusively, wherein the pocket is positioned opposite the impingement cooling hole, wherein the sidewall is tapered between the outer edge and the vertex, wherein the sidewall forms a taper angle between a point of the sidewall and a base plane that is between ten and forty degrees inclusively, wherein the point of the sidewall is closer to the outer edge than the vertex, and wherein the base plane intersects the vertex and is parallel to the surface of the second wall.

7. The dual wall structure of claim 6, wherein the impingement cooling hole has a central axis, and wherein the central axis intersects a center of the first circle and a center of the second circle.

8. The dual wall structure of claim 7, wherein the pocket is configured to redirect a cooling fluid received from the impingement cooling hole into the cooling passage in a direction that is radially away from the center of the second circle.

9. The dual wall structure of claim 7, wherein the central axis intersects the vertex.

10. The dual wall structure of claim 6, wherein the point comprises a first point, and wherein a cross sectional area of the pocket at a second point on the sidewall is equal to a cross sectional area of the impingement cooling hole.

11. A hot section component of a gas turbine engine, the hot section component comprising:

a first wall and a second wall, the first wall and the second wall defining a cooling passage between the first wall and the second wall, wherein the second wall includes a surface that is substantially flat and faces the first wall, wherein the first wall includes an impingement cooling hole, and wherein the second wall comprises a pocket extending into the second wall and away from the first wall, wherein the pocket is cone-shaped and comprises an outer edge defining a mouth in the surface of the second wall, an oppositely disposed vertex, and a sidewall extending between the outer edge and the vertex, wherein the outer edge is positioned opposite the impingement cooling hole, wherein a diameter of the impingement cooling hole is less than a diameter of the mouth, and wherein the cooling passage includes a single cooling passage into which the pocket is configured to direct a cooling fluid, wherein the sidewall is tapered between the outer edge and the vertex, wherein the sidewall forms a taper angle between a point of the sidewall and a base plane that is between ten and forty degrees inclusively, wherein the point of the sidewall is closer to the outer edge than the vertex, and wherein the base plane intersects the vertex and is parallel to the surface of the second wall.

12. The hot section component of claim 11, wherein the vertex is axially positioned in alignment with the impingement cooling hole.

13. The hot section component of claim 11, wherein the impingement cooling hole is positioned in a first predetermined pattern, and the pocket is positioned in a second predetermined pattern that matches the first predetermined pattern.

14. The hot section component of claim 11, wherein the pocket is positioned offset with respect to the impingement cooling hole.

15. The hot section component of claim 11, wherein the impingement cooling hole is positioned obliquely in the first wall, wherein a central axis of the impingement cooling hole intersects the vertex.

* * * * *